M. HOWE.
Steam-Washer.
No. 169,104. Patented Oct. 26, 1875.
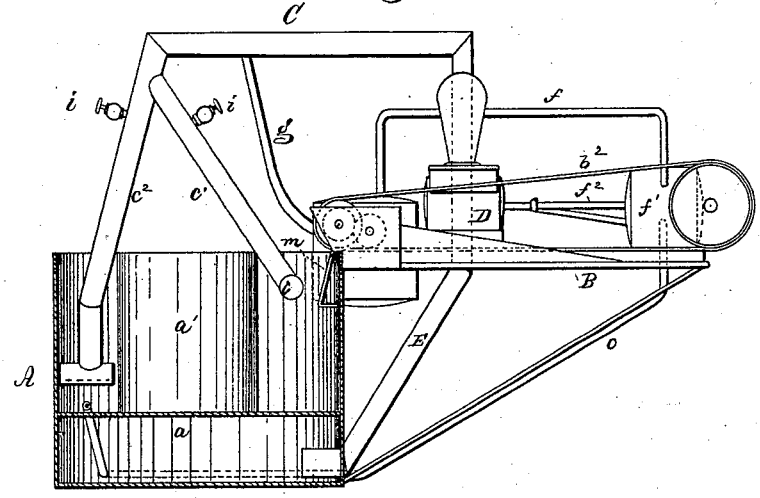
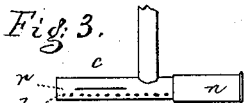
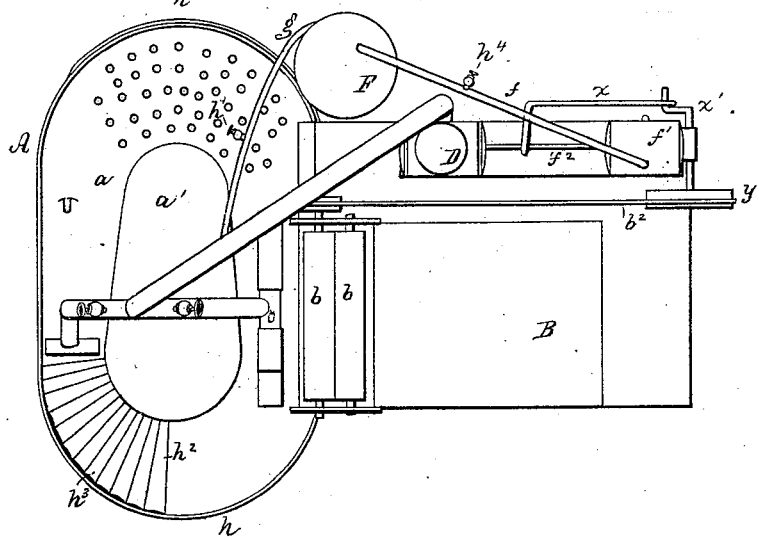
Witnesses.
L. H. Latimer.
Wm. Pratt.
Inventor.
Manley Howe
PER Crosby Gregory
ATTYS.

UNITED STATES PATENT OFFICE.

MANLEY HOWE, OF BOSTON, MASSACHUSETTS.

IMPROVEMENT IN STEAM-WASHERS.

Specification forming part of Letters Patent No. 169,104, dated October 26, 1875; application filed February 6, 1875.

*To all whom it may concern:*

Be it known that I, MANLEY HOWE, of Boston, in the county of Suffolk and Commonwealth of Massachusetts, have made an Improvement in Steam-Washer for laundry purposes, of which the following is a specification:

My invention relates to a steam-washer for laundry purposes; and has for its object the production of a machine in which the water is kept in motion by means of a steam-pump that takes the water from the tank and returns it to the tank under powerful head, the water being discharged into the tank and through a pipe having, preferably, two branches, one of which is provided with a multiple-mouthed or perforated or slotted discharge-pipe that directs the water against the fabrics or material being washed on entering the machine, and the other directs the water into the tank tangential to the surface of the water therein, and keeps the fabric and water in circulation. The water-pipes are also connected directly with a pipe leading from a steam-generator, and steam may be admitted directly into the water-pipe, adding greater force and heating the water therein to any degree.

Figure 1 is a side view partially in section. Fig. 2 is a top view, and Fig. 3 is a detail of the multiple-mouthed discharge-pipe.

In the drawing, A is the tank, preferably oval in form, but it may be made circular or of other suitable shape, having an interior perforated or reticulated bottom, $a$, and a central partition, $a^1$, to divide the tank, so as to form a channel or way for the movement of the material being washed and of the water. I place a table, B, at the side of the tank, and provide it with a pair of squeezing-rollers, $b$, operated from a pulley, $b^1$, by means of a belt, $b^2$, and the material to be washed is preferably soaked or immersed in water, and is led from the table and into the tank between the squeezing-rollers. As the material leaves the rollers it is acted on by jets of water issuing from the multiple-mouthed or perforated discharge-pipe $c$, connected with a branch, $c^1$, of the tank-supplying pipe C, that supplies the tank A with water, and which is connected with a steam or other forcing pump, D, placed at the side of the tank and drawing its water through a pipe, E, from the tank A. A second branch, $c^2$, of the tank-supplying pipe C leads into or just above the water in the tank, and the water issuing therefrom acts tangentially to the surface of the water in the tank, and keeps it and the material in circulation. These branches $c^1$ and $c^2$ will, preferably, be made to slide, or might have a part thereof made flexible, so as to rise or fall, and so that $c^1$ may adapt itself to the quantity of the material in the tank, or so as to adjust its position with relation to the depth of water, or its inclination with relation to the water, so as to regulate the movement of the material through the tank. The steam-generator F, of any well-known or suitable construction, has a pipe, $f$, for supplying the cylinder $f^1$ with steam, so as through its piston $f^2$ to operate the steam-pump D. This cylinder and pump are to be of any well-known construction, but I prefer to employ what is known as the Blake pump. The steam-pump has a pipe, E, leading to the tank A, under the bottom piece $a$. The bottom piece A is preferably set at an inclination higher at the end $h$ than at the end $h^1$ of the tank, and at or near end $h$ the bottom piece and tank are ribbed or corrugated, as at $h^2$ $h^3$, so as to serve as the ribs of a wash-board, and at the lower end of the bottom piece there are openings to allow the water to pass below it and keep the pipe E and the pump supplied. It is preferred to place the pump on a level with or below the bottom of the tank, as is common to locate pumps for pumping hot water. To the piston-rod I connect a link, $x$, that operates a crank, $x'$, having its shaft supported in bearings in the steam-cylinder, and this shaft has a pulley, $y$, to receive the belt $b^2$ that operates the squeezing-rollers. These rollers are preferably of rubber, or made like the rollers of clothes-wringers. A pipe, $g$, leads from the steam-generator to the main tank-supplying pipe C, and it allows steam to pass into the pipe to heat the water or increase the force of the water. These pipes leading from the steam-generator are to be supplied with valves $h^4$, for controlling the admission of steam, and the pipes $c^1$ $c^2$ are also provided with valves $i$ to control the flow of water. The multiple-mouthed discharge-pipe $c$ has a row of holes, $l$, to throw the water in a number of small streams against the material passing from the rollers *b* and over the apron *m*, which may be made smooth or perforated, and these holes may be capped or closed by a sleeve, *n*. The end of pipe $c^2$ is also perforated or open, as at Fig. 3. The exhaust-pipe *o* from the steam-cylinder $f^1$ leads to the tank A, and is placed therein so as to assist in keeping the water in the tank in motion, and also serves to heat the water therein. The water may be cut off from either pipe $c^1$ or $c^2$, and the other used, and my devices may be used to wash fabric or wool. The exhaust-pipe acts with a considerable force, and assists greatly in urging the material and water up the incline of the bottom piece *a*. The discharge-pipes might be slotted, as at *r*, Fig. 3, instead of being perforated. A proper amount of soap or cleansing material is added to the water.

Having described my invention, I claim—

1. In combination, the tank provided with bottom *a*, the feeding-rollers *b*, and the steam-pump and its connected pipes C E, all operating as and for the purpose described.

2. The combination, with the ribbed tank A and its central partition $a^1$, of the perforated and ribbed bottom inclined with relation to the bottom of the tank, substantially as described.

3. The combination, with the steam-pump and tank, of the perforated or slotted discharge-pipe and sleeve *n*, substantially as described.

4. The combination, with the tank and the cylinder $f^1$, of the perforated discharge-pipe and the exhaust-pipe *o*, arranged to introduce the water in the tank and heat the water, substantially as described.

5. The combination, with the tank, of the supply-pipe C, the generator, and the steam-pipe *g* leading into the supply-pipe, substantially as described.

In testimony whereof I have signed my name to this specification in the presence of two subscribing witnesses.

MANLEY HOWE.

Witnesses:
  G. W. GREGORY,
  S. B. KIDDER.